Oct. 16, 1945.  T. HELME  2,387,020
MOTORCYCLE BRAKE ACTUATOR
Filed April 13, 1944
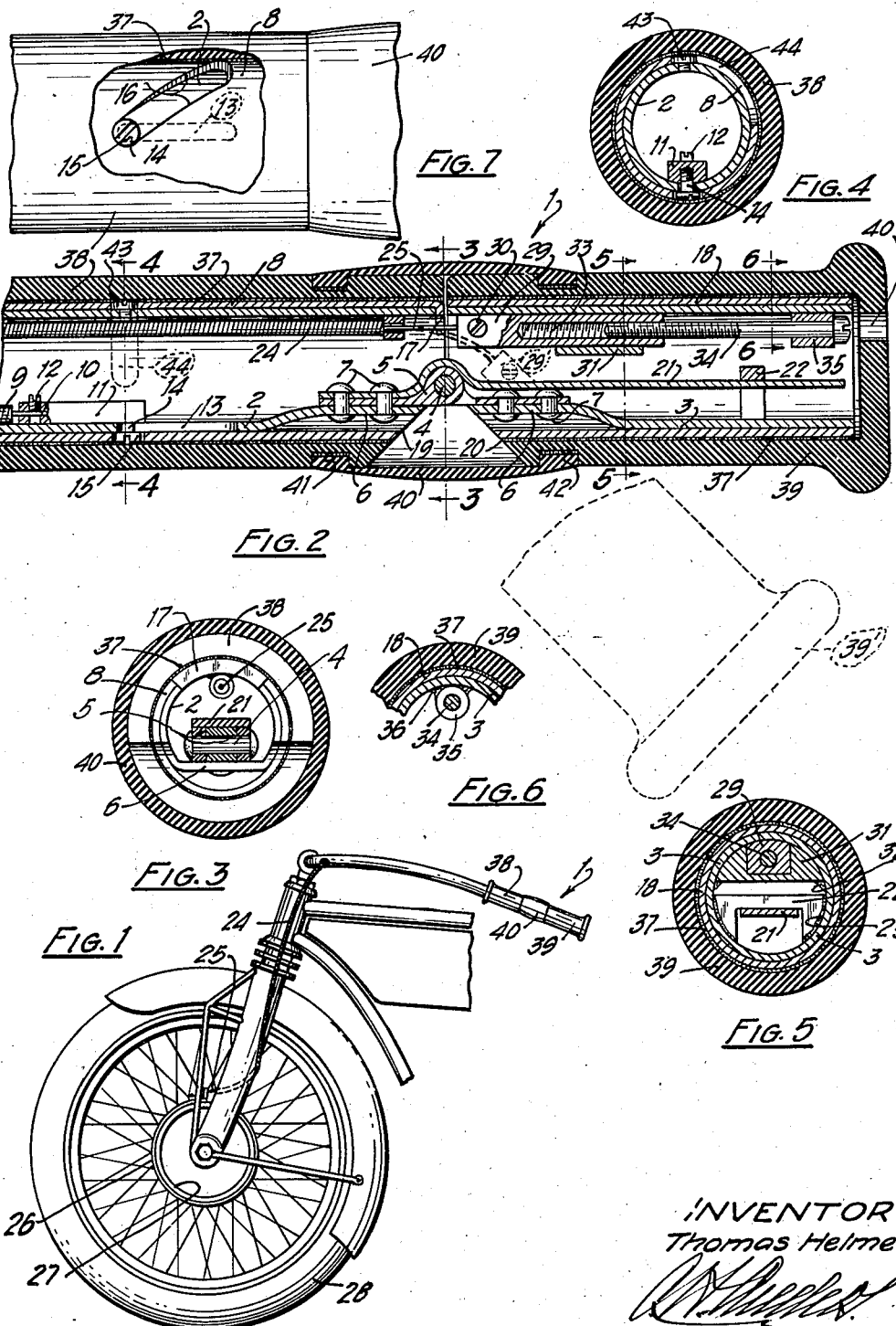
INVENTOR
Thomas Helme
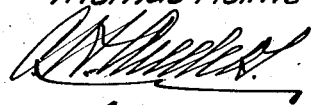
ATTORNEY Patented Oct. 16, 1945

2,387,020

UNITED STATES PATENT OFFICE 2,387,020

MOTORCYCLE BRAKE ACTUATOR

Thomas Helme, Albany, N. Y.

Application April 13, 1944, Serial No. 530,884

4 Claims. (Cl. 74—489)

My invention relates to motorcycles and particularly to an improved means for actuating the brakes thereof.

Many motorcycles are at present equipped with a front wheel brake but, in order to apply the same, the actuator is so positioned that the operator must remove a hand from the handlebar grip. The service brake is ordinarily applied by the foot but where a sudden stop is necessary it is desirable to apply both the foot and the hand brake. Since emergencies which demand the application of all the available brakes also require the operator, at the same time, to maintain full steering control of the cycle by keeping both hands on the handlebars it is quite impossible, with the present types of actuators, for the operator simultaneously to do both of these things.

The principal object of my invention, therefore, is to provide a brake actuator and particularly a front wheel brake actuator which can be manipulated without removing either of the hands from the handlebars. More specifically, the object of my invention is to provide a brake actuator which is included within and which forms a part of one of the handlebar grips.

I accomplish this and other objects by the novel elements and the combinations and arrangements thereof described below and illustrated in the accompanying drawing in which—

Fig. 1 is a fragmentary side elevation view of a motorcycle equipped with my brake actuator;

Fig. 2 is a fragmentary longitudinal section in a vertical plane, with certain parts broken away, of my actuator;

Fig. 3 is a section in the plane 3—3 of Fig. 2;

Fig. 4 is a section in the plane 4—4 of Fig. 2;

Fig. 5 is a section of Fig. 2 in the plane 5—5;

Fig. 6 is a section of Fig. 2 in the plane 6—6; and

Fig. 7 is a fragmentary bottom view of the actuator with certain portions thereof broken away to show the interior construction.

Referring to the drawing—

1 indicates generally my brake actuator which is secured to and forms a part of the tubular handlebar 2. The end portion 3 of the handle bar tube is separate from the rest of the bar but is pivotally connected thereto at 4 by means of the hinge 5. The bottom portion of the handlebar tube on either side of the hinge is flattened as shown at 6 in Figs. 2 and 3 and the hinge is secured to the flattened portion by means of rivets 7, or otherwise. Closely but rotatively fitted over the tube 2, and adjacent the end thereof, is a cam sleeve 8 which may be turned on the handlebar in the usual way to control either the throttle or spark. 9 is the housing for a Bowden wire 10 one end of which is secured in the slidable block 11 by means of the set screw 12 or otherwise. Pulling on this wire from the position shown, which is the closed throttle position, will open the throttle or advance the spark as is well understood in the art. In order to effect a pull on the wire 10 by the rotation of the sleeve 8 a slot 13 is provided in the bottom of the handlebar, as shown in Figs. 2 and 7, and a screw 14 passing through this slot is threaded into the block 11, as shown in Fig. 4. The head 15 of the screw 14 is enlarged so that it cannot pass through the slot 13 and is positioned in the helical cam slot 16 in the cam sleeve 8. A portion 17 of the end of the sleeve 8 is bent downwardly over the end of the handlebar 2, as shown in Figs. 2 and 3, to form a stop limiting the distance which the tube 8 can be slid forwardly over the handlebar tube 2. Thus, it will be apparent, that by rotating the tube 8 the screw 14 can be moved to the right in slot 13 by reason of the cam action of the slot in the sleeve 8 and thus effect a pull on wire 10. Screw 15 will normally prevent sleeve 8 from being pulled off tube 2. However, a second screw 43 threaded into tube 2 and passing through a slot 44 in sleeve 8 may be used if desired.

The end portion 3 of the handlebar which is pivotally connected to the main portion 2 is also provided with an external sleeve 18 which is rotatable thereon. The portions of the tubes 2 and 3 and the sleeves 8 and 18 are cut away below the hinge pin 4, as shown at 19 and 20, to provide clearance so that, when the parts are in the positions shown in Fig. 2, the end portion 3 of the handlebar tube with the sleeve 18 thereon may be flexed downwardly about the pivotal connection 4. In order to maintain the pivotally connected end portion of the handlebar in alignment with the rest of the bar I provide a flat spring 21 which is secured to the fixed portion of the handlebar by the hinge rivets 7 and which extends towards the end of the bar and slides beneath the element 22 which is welded or otherwise secured to the inside of the tube 3 as shown at 23. This spring is biased to hold the end of the handlebar up in alignment with the principal portion of the bar but is designed to yield when the end portion of the handlebar is flexed downwardly into the position shown in dotted outline in Fig. 2.

24 is the housing for a Bowden wire 25 (see Figs. 1 and 2) which when pulled will contract the brake band 26 on the brake drum 27 which is secured to the front wheel 28 of the motorcycle. The wire 25 is secured in the block 29 by means of a screw 30, or otherwise, and this block is slidably mounted in a bracket 31 which is welded or otherwise secured to the inside of the tube 3, as shown at 32. The block 29 is provided with the threaded passage 33 with which the screw 34 cooperates and this screw is rotatably secured in the bracket 35 which is welded or otherwise secured to the inside of the tube 3, as shown at 36.

Surrounding and adhesively secured, as shown at 37, to the cam sleeve 8 is a sleeve 38 which may be of rubber forming a portion of the hand grip. Similarly surrounding and adhesively secured to the sleeve 18 is the end portion 39 of the hand grip which is provided with a hole 40 for the passage of a screw driver to turn screw 34. The bottom portions of the grips 38 and 39, in the throttle closed position, are also cut away as shown at 19 and 20 so that they do not interfere with the downward movement of the end portion of the grip. The separate portions of the grip are secured together by the resilient rubber sleeve 40 having end portions 41 and 42 which engage and are preferably cemented in grooves in the grips 38 and 39. This rubber sleeve 40 thus encloses the center portion of the grip and serves to secure the sleeve 18 and the covering portion 39 of the grip to the portion 38 of the grip.

From the foregoing it will be apparent that the sleeves 8 and 18 form a carrier for a substantially continuous grip on the handlebar which may be rotated in the usual way either to advance or retard the spark or to open or close the throttle. However, when the parts are in the position shown in Fig. 2 with the throttle closed the free end of the grip may be depressed or flexed downwardly to the position shown in dotted outline 39' in Fig. 2. This will move the block 29 to the position shown in dotted outline at 29' and thus effect a pull on the wire 25 to apply the front wheel brake. Furthermore, the clearance between the brakeband 26 and the drum 27 may be adjusted by turning the screw 34.

It is obvious that my brake actuator may be applied to ordinary bicycles as well as motorcycles and hence the term motorcycle, as used herein and in the claims, is intended to include a bicycle.

While I have described my invention in its preferred embodiment it is to be understood that the words which I have used are words of description rather than of limitation and that changes within the purview of the appended claims may be made without departing from the true scope and spirit of my invention.

What I claim is:

1. In a motorcycle having a brake, a brake actuator comprising a handlebar, a grip, means for securing said grip to said handlebar in rotatable and also in flexible relation thereto; whereby said grip is adapted to actuate one device by a rotating movement thereof and a second device by a flexing movement thereof; said brake constituting one of said two devices; and means operatively connecting said grip to said brake for actuating the latter by one of the two said movements of said grip.

2. In a motorcycle having a brake, a brake actuator comprising a handlebar, a grip, means for securing said grip to said handlebar in rotatable and also in flexible relation thereto; whereby said grip is adapted to actuate one device by a rotating movement thereof and a second device by a flexing movement thereof; said brake constituting one of said two devices; and means operatively connecting said grip to said brake for actuating the latter by the flexing movement of said grip.

3. A brake actuator for a motorcycle having a motor controlling means and a brake; said actuator comprising a handlebar, means movably mounted on said bar and comprising two cylindrical sleeves normally coaxial with said bar and forming a carrier for a grip for the hand of the operator; at least one of said sleeves being rotatable relative to said bar and provided with means for actuating said motor controlling means when said sleeve is rotated, and the other of said sleeves being movable independently of the motor controlling movements of said one sleeve and out of axial alignment with said bar; and means actuated by the movement of said other sleeve and cooperating with said brake for actuating the same.

4. In a motor cycle, a combined brake actuator and motor control device comprising a handlebar, a grip, means securing said grip to said handle bar in rotatable and also in flexible relation thereto, means cooperating with said grip and adapted to actuate a motor controlling means upon a rotative movement of said grip, and means cooperating with said grip and adapted to actuate said brake upon a flexing movement of said grip.

THOMAS HELME.